United States Patent [19]

Hirano et al.

[11] Patent Number: 5,678,068
[45] Date of Patent: Oct. 14, 1997

[54] MOTION COMPENSATION DRIVE STOP DEVICE WHICH PREVENTS EXCESSIVE IMAGE MOTION DURING EXPOSURE

[75] Inventors: Shinichi Hirano, Tokyo; Nobuhiko Terui, Ichikawa, both of Japan

[73] Assignee: Nikon Corporation, Tokyo, Japan

[21] Appl. No.: 492,443

[22] Filed: Jun. 19, 1995

[30] Foreign Application Priority Data

Jun. 17, 1994 [JP] Japan .................................. 6-135939

[51] Int. Cl.$^6$ ............................................ G03B 5/00
[52] U.S. Cl. ..................................................... 396/55
[58] Field of Search ................................ 354/430, 202; 348/208; 359/554; 396/55, 54, 53, 52

[56] References Cited

U.S. PATENT DOCUMENTS 5,220,375  6/1993  Ishida et al. ......................... 354/419

Primary Examiner—W. B. Perkey

[57] ABSTRACT

A motion compensation device which prevents excessive image motion during exposure due to an error in target drive speed of a motion compensation drive device. The motion compensation device includes a photographic optical system, a motion detection device to detect motion of the photographic optical system, and a motion compensation drive device to shift at least a portion of the photographic optical system and an imaging plane relative to each other. A motion compensation control unit generates a motion compensation control signal for the motion compensation drive based on the output of the motion detection device. A motion compensation drive stop device stops the motion compensation drive after a specified amount of time has passed since motion compensation control started, regardless of whether the motion compensation control unit is generating a motion compensation control signal to drive the motion compensation drive.

9 Claims, 5 Drawing Sheets

5,678,068

MOTION COMPENSATION DRIVE STOP DEVICE WHICH PREVENTS EXCESSIVE IMAGE MOTION DURING EXPOSURE

BACKGROUND OF THE INVENTION

1. Field of the Invention

The present invention relates to an optical system having a motion compensation device, and, more particularly, the present invention relates to a photographic optical system having a motion compensation device which prevents excessive image motion during exposure caused by an error in a target driving speed of a motion compensation driving device.

2. Description of the Related Art

Photographic devices, such as cameras, are known which include both a motion compensation device to compensate for motion of a photographic optical system and an autofocus (AF) device as standard features. Optical systems project an image onto an image plane. Conventional image blur suppression devices suppress, or reduce, blurring of the image. A motion compensation device is a type of image blur suppression device, and compensates for motion incident upon the optical system. Motion is typically imparted to the optical system by vibrations in the optical system, or in a surrounding holding member. In general, conventional motion compensation devices cause a compensation lens to shift counter to the motion of the optical system so as to shift the image projected by the optical system relative to the optical system. Conventional cameras use a motion compensation device to suppress image blur resulting from motion of the camera. Such motion is typically caused by hand tremors of the photographer. A motion compensation apparatus is disclosed, for example, in Japanese Laid-Open Patent publication Hei 2-66535, which discloses a motion compensation device for a single lens optical system. Another example of a motion compensation apparatus is disclosed in Japanese Laid-Open Patent publication Hei 2-183217 which discloses a motion compensation apparatus which compensates for motion by shifting a portion of a photographic optical system of an internal focusing telescopic lens.

However, a problem results in the conventional motion compensation devices when an amount of time for exposure control exceeds a specified amount of time. Specifically, when the time required to perform exposure control exceeds a specified amount of time, the amount of image movement during exposure will be relatively large if motion compensation control is not performed because of an error in a target driving speed of a motion compensation driving device which is computed based on output of a motion detection device. Thus, the error in the target driving speed will cause picture quality to decrease.

SUMMARY OF THE INVENTION

Accordingly, it is an object of the present invention to provide a photographic device having a motion compensation device which prevents excessive image movement during film exposure due to an error in a target driving speed of a motion compensation driving device.

It is another object of the present invention to provide a motion compensation device which provides good picture quality even when a long exposure control time occurs.

Objects and advantages of the present invention are achieved with a photographic device including a lens device having a photographic optical system, and a motion compensation device to compensate for motion of the photographic optical system which may cause image blurring. The motion compensation device includes a motion detection device to detect motion of an optical axis of the photographic optical system, a motion compensation drive device to shift at least a portion of the photographic optical system and an imaging plane relative to each other, a motion compensation control unit to generate a motion compensation control signal to control the motion compensation drive based on the output of the motion detection device, and a motion compensation drive stop device, which may be included in the lens device, to halt the drive of the motion compensation drive after a specified amount of time has passed since the motion compensation control is started, regardless of the motion compensation control signal from the motion compensation control unit.

The motion compensation drive stop device in accordance with the present invention may include a device within the lens which sets a predetermined amount of time to perform motion compensation, during which the target driving speed error of the motion compensation drive is within the tolerance range of the motion compensation drive. The motion compensation drive stop device may also include a computation device within the lens which computes a predetermined time from the receipt of a motion compensation drive start signal from the motion compensation control device to stop motion compensation drive.

The motion compensation drive in accordance with the present invention is stopped after a predetermined amount of time (time of maximum motion) has passed since the start of motion compensation control, preventing an increase in the amount of image motion during exposure due to error in target driving speed of the motion compensation drive. Further, when the motion compensation drive stop device is included in the lens device, accurate motion compensation and stopping are possible based on the different motion compensation tolerance ranges for each lens device.

Still further, since the motion compensation stop device fixes the predetermined amount of time during which the target driving speed error of the motion compensation drive is within the tolerance range of the motion compensation drive, motion compensation can be performed for the longest time interval in which error does not become large.

BRIEF DESCRIPTION OF THE DRAWINGS

Objects and advantages of the present invention will become apparent and more readily appreciated from the following description of the preferred embodiments taken in conjunction with the accompanying drawings of which.

DESCRIPTION OF THE PREFERRED EMBODIMENTS

Figure 1:
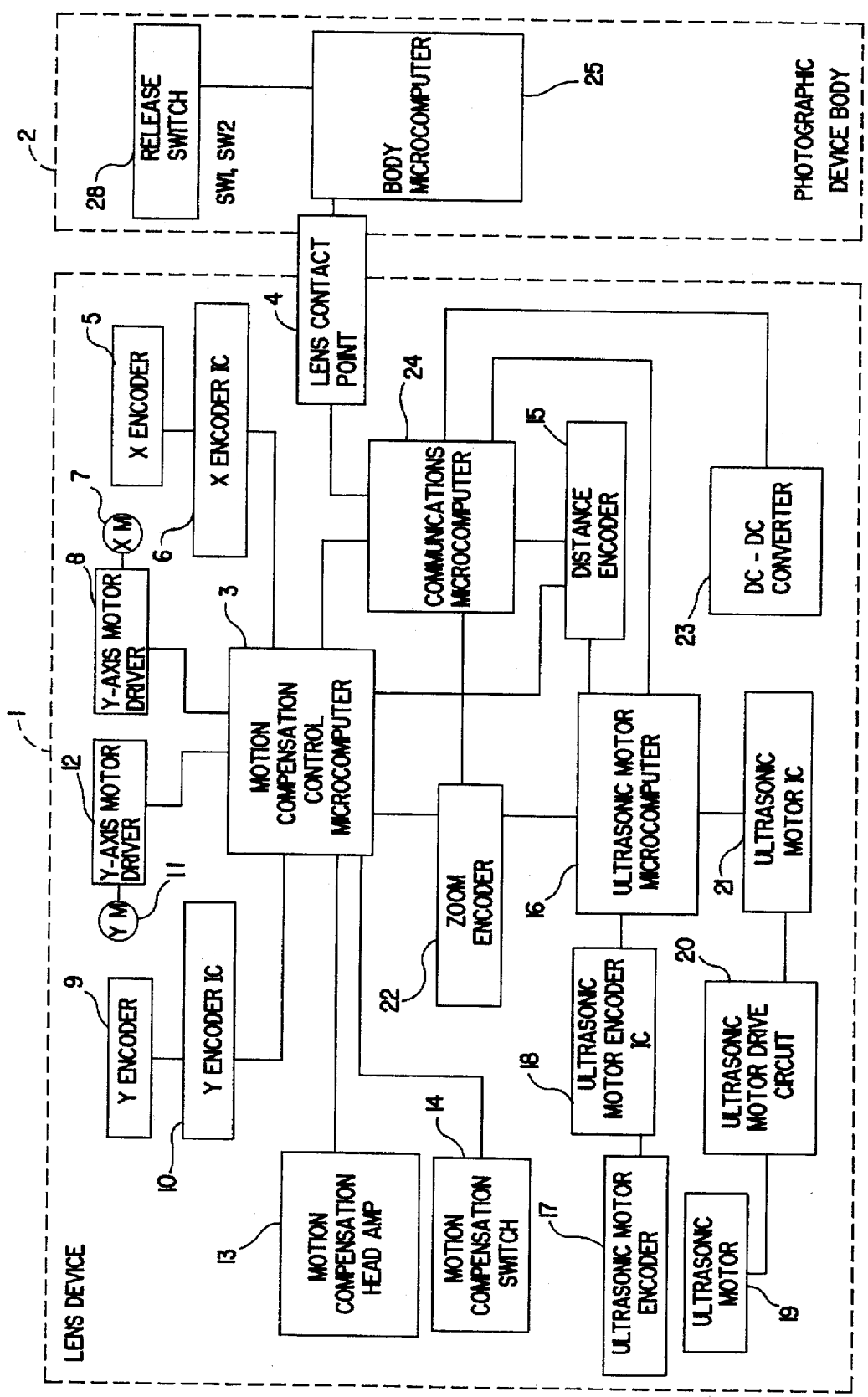
FIG. 1 is a block diagram of a motion compensation device in accordance with embodiments of the present invention.

Reference will now be made in detail to the present preferred embodiments of the present invention, examples of which are illustrated in the accompanying drawings, wherein like reference numerals refer to like elements throughout.

Figure 3:
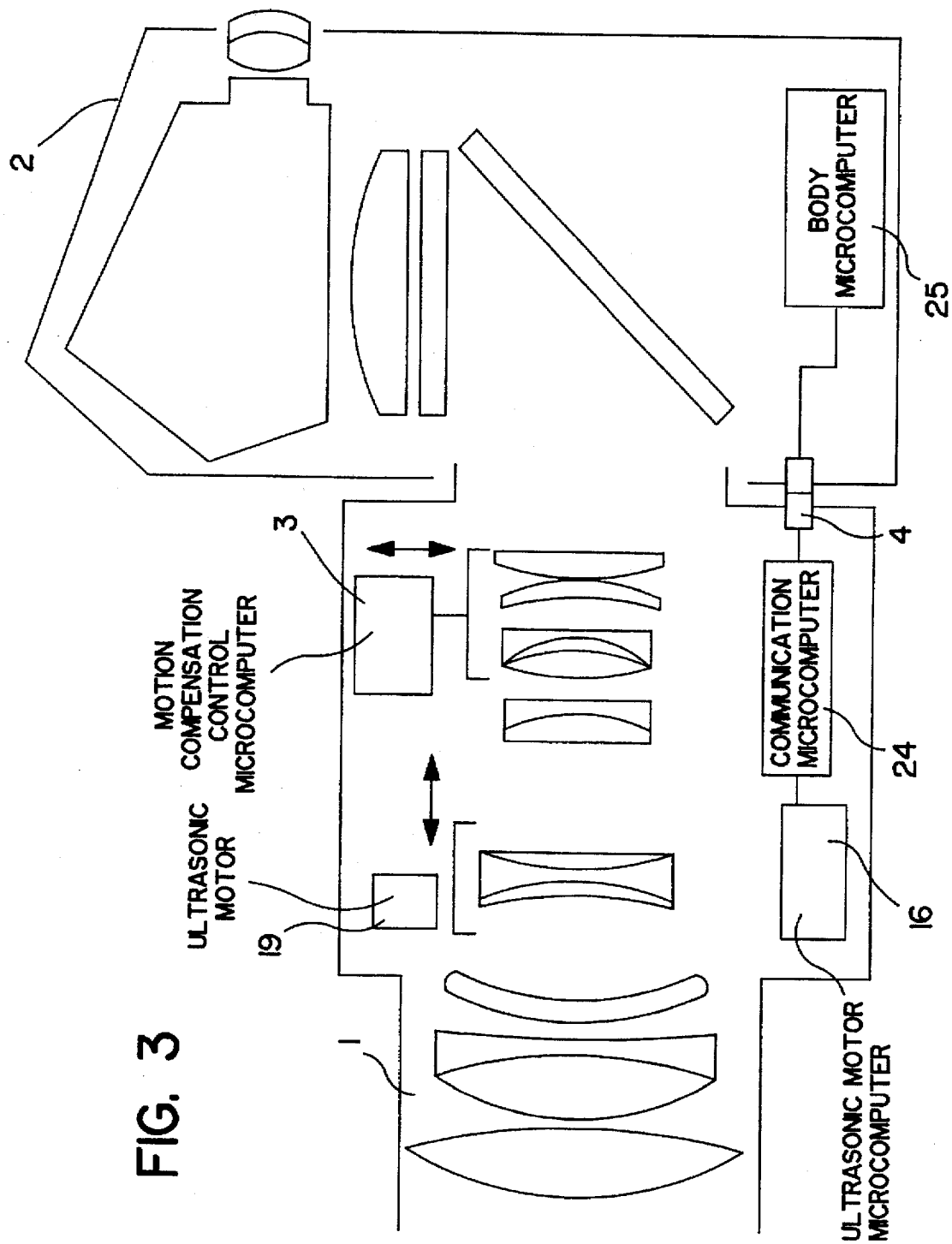
FIG. 3 is a side view of a photographic device including a photographic optical system showing the internal structure of the photographic device in accordance with embodiments of the present invention.

A photographic device having a motion compensation device in accordance with embodiments of the present invention will now be described with reference to FIGS. 1 and 3. The photographic device may be a camera, such as a single lens reflect camera, or other type of camera or imaging device.

FIG. 1 is a block diagram of a photographic device having a motion compensation device in accordance with embodiments of the present invention. FIG. 3 is a side view of a photographic device showing a motion compensation optical system in accordance with embodiments of the present invention. As shown in FIGS. 1 and 3, the photographic device is comprised of a lens device 1 and a photographic device body 2. The lens device 1 includes a motion compensation control microcomputer 3, an ultrasonic motor (USM) microcomputer 16 and a communications microcomputer 24. The photographic device body 2 includes a body microcomputer 25.

A lens contact point 4 represents the electrical points of contact that are used for transmitting signals between the photographic device body 2 and the photographic lens device 1. The lens contact point 4 connects the communications microcomputer 24 and the body microcomputer 25.

As shown in FIG. 1, the motion compensation control microcomputer 3 controls a motion compensation drive, comprising an X-axis drive motor 7, an X-axis motor driver 8, a Y-axis motor 11 and a Y-axis motor driver 12, based on optical system position data received from the body microcomputer 25 in the photographic device body 2 and data received from each of four encoders, X-encoder 5, Y-encoder 9, distance encoder 15 and zoom encoder 22.

The X-encoder 5 detects an amount of movement of the optical system in an X-axis direction and outputs the detected amount of movement to an X-encoder integrated circuit (IC) 6. The X-encoder IC 6 converts the detected amount of movement of the optical system in the X-axis direction to an electrical signal representing the detected amount of movement, and this signal is sent to the motion compensation control microcomputer 3. The motion compensation control microcomputer 3 sends a signal to the X-axis motor drive 8 which drives the X-axis motor 7 to shift the motion compensation optical system in the X-axis direction.

In a similar manner, the Y-encoder 9 detects an amount of movement of the optical system in the Y-axis direction and outputs the detected amount of movement to a Y-encoder IC 10. The Y-encoder IC 10 converts the detected amount of movement of the optical system in the Y-axis direction to an electrical signal representing the detected amount of movement, and this signal is sent to the motion compensation control microcomputer 3. The motion compensation control microcomputer 3 sends a signal to the Y-axis motor drive 12 which drives the Y-axis motor 11 to shift the motion compensation optical system in the Y-axis direction. A motion compensation head amplifier 13 detects an amount of motion and converts the detected amount of motion to an electrical signal representing the detected amount of motion. The electrical signal representing the detected amount of motion is then sent to the motion compensation control microcomputer 3. The motion compensation head amplifier 13 is, for example, an angular velocity sensor.

A motion compensation MC switch 14 switches the motion compensation drive ON or OFF, and also switches between two motion compensation modes, referred to hereinafter as mode 1 and mode 2. For example, motion compensation mode 1 is a coarse control mode in which coarse control is conducted for compensating for motion causing blurring of the viewfinder image after photographic preparatory actions have started. Motion compensation mode 2 is a fine control mode in which precise control is conducted to compensate for motion causing image blurring during exposure.

The distance encoder 15 detects a focus position and converts the detected focus position to an electrical signal representing the detected focus position. The output of the distance encoder 15 is connected to the motion compensation control microcomputer 3. The distance encoder 15 is also connected to the ultrasonic motor microcomputer 16 and to the communications microcomputer 24. The ultrasonic motor microcomputer 16 controls the ultrasonic motor 19 to drive the focusing optical system. An ultrasonic motor (USM) encoder 17 detects an amount of movement of the ultrasonic motor 19 and the output of the USM encoder 17 is sent to a USM encoder IC 18. The USM encoder IC 18 converts the amount of movement of the ultrasonic motor 19 into an electrical signal representing the amount of movement of the ultrasonic motor 19, and this electrical signal is sent to the ultrasonic motor microcomputer 16.

An ultrasonic motor drive circuit 20 has a drive frequency specific to the ultrasonic motor 19, and generates two drive signals that are 90° out of phase with each other. An ultrasonic motor IC 21 interfaces the ultrasonic motor microcomputer 16 with the ultrasonic motor drive circuit 20 and ultrasonic motor 19.

The zoom encoder 22 detects the lens focus position and converts the detected lens focus position to an electrical signal representing the detected lens focus position. The output of the zoom encoder 22 is connected to the motion compensation microcomputer 3, the ultrasonic motor microcomputer 16, and the communications microcomputer 24.

A DC-DC converter 23 supplies a steady DC voltage even when there are fluctuations in the battery voltage. The DC-DC converter 23 is controlled by a signal from the communications microcomputer 24.

The communications microcomputer 24 communicates with the lens device 1 and the photographic device body 2. The communications microcomputer 24 sends commands to the motion compensation control microcomputer 3 and the ultrasonic motor microcomputer 16 in the lens device 1.

The photographic device body 2 includes a release switch 28 mounted thereon which comprises a half-depression switch SW1 which starts a photographic preparatory action when a release button is half pressed, and a full-depression switch SW2 which provides a signal indicating the start of exposure control when the release button is fully pressed.

Figure 2:
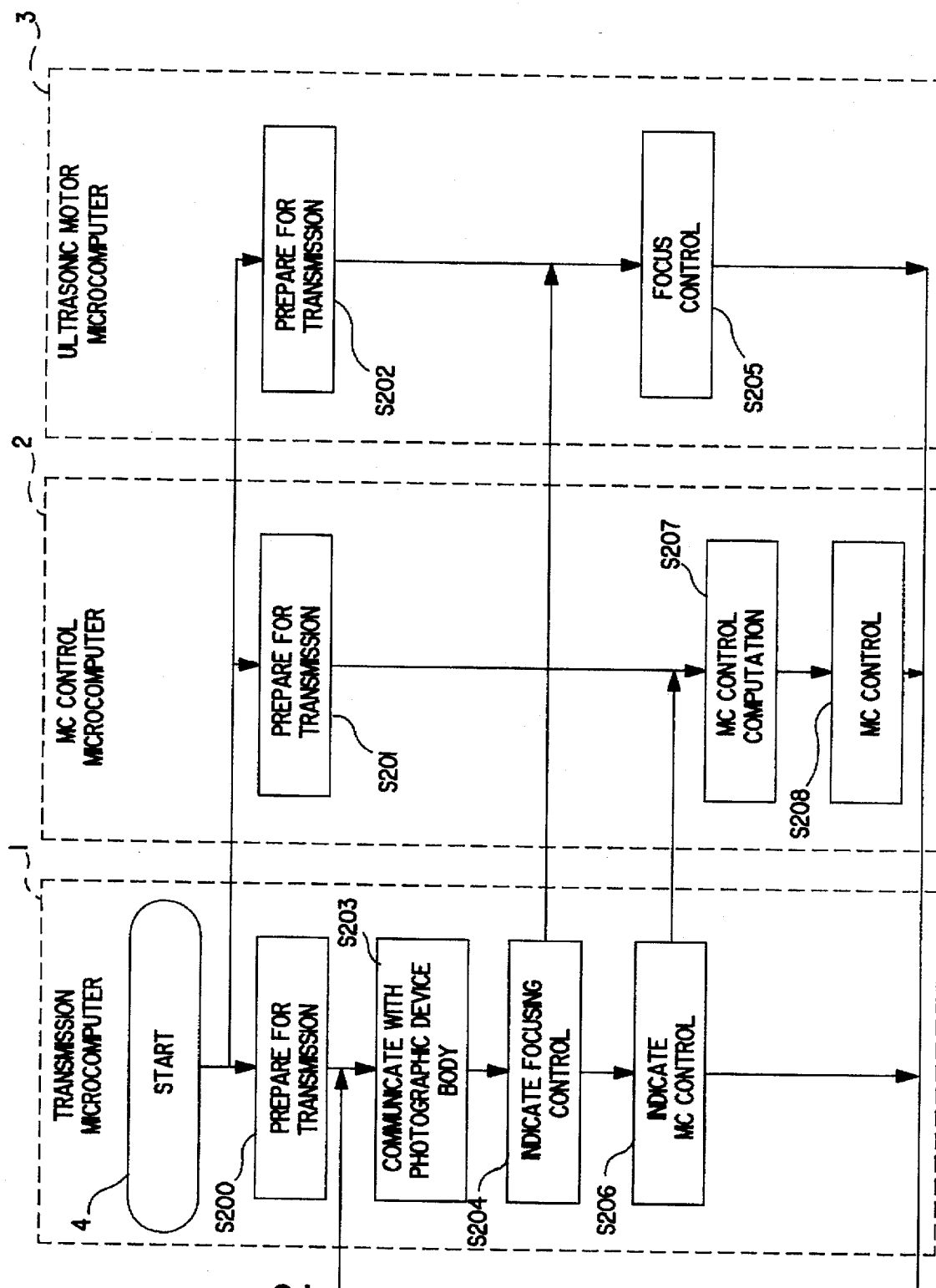
FIG. 2 is a flow chart showing an operational process for performing photography in accordance with embodiments of the present invention.

FIG. 2 is flow chart showing an operational process for performing a photographic process in accordance with embodiments of the present invention. In FIG. 2, the steps of the operational process which are respectively performed by the communications microcomputer 24, the motion compensation control microcomputer 3 and the ultrasonic motor microcomputer 16 are enclosed within dashed boxes.

Beginning in step S200, communications microcomputer 24 prepares for communication. At the same time that the communications microcomputer 24 is preparing for communication, the motion compensation control microcomputer 3 prepares for communication (step S201), and the ultrasonic motor microcomputer 16 prepares for communication (step S202). The communications microcomputer 24 then communicates (step S203) with the photographic device body 2 via the lens contact point 4 to receive focusing control information and motion compensation control information. Next, the focus control information received from the photographic device body 2 is transmitted (step S204) to the ultrasonic motor microcomputer 16. The ultrasonic motor microcomputer 16 performs focus control (step S205) based on the data received from the zoom encoder 22 and the distance encoder 15.

Continuing in step S206, the motion compensation control information received from the photographic device body 2 is transmitted to the motion compensation control microcomputer 3. The motion compensation control microcomputer 3 performs a motion compensation control computation (step S207) and the motion compensation control microcomputer 3 then performs motion compensation control (step S208).

Figure 4:
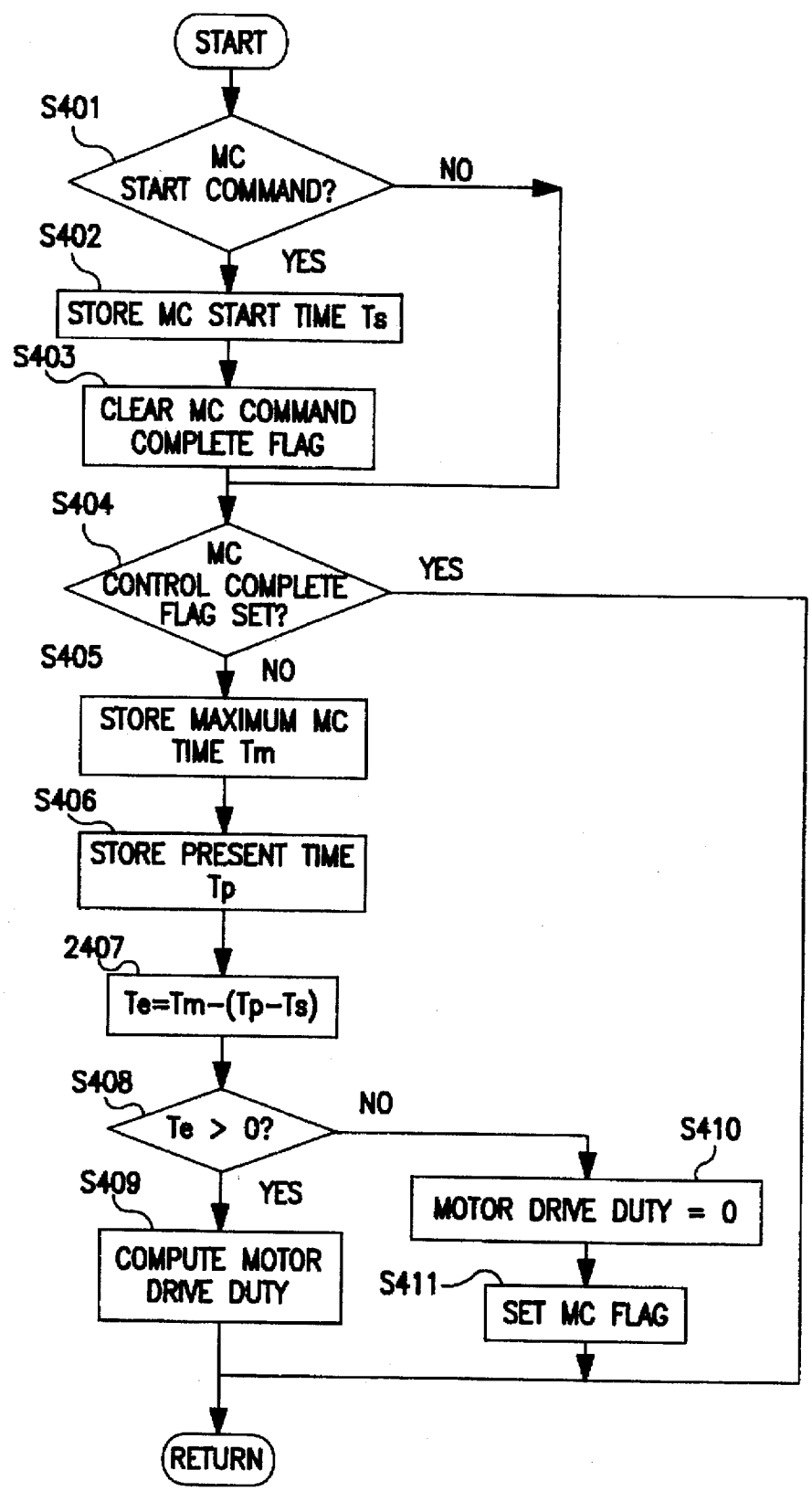
FIG. 4 is a flow chart showing an operational process for performing motion compensation in accordance with embodiments of the present invention.

FIG. 4 is a flow chart showing an operational process for performing the motion compensation computation of step S207 in FIG. 2.

Beginning in step S401, motion compensation microcomputer 3 determines whether the command from the communications microcomputer 24 is a motion compensation start command. If the command from communications microcomputer 24 is a motion compensation start command, then the motion compensation microcomputer 3 stores (step S402) a start time Ts when the motion compensation start command is received from the communications microcomputer 24. The motion compensation microcomputer 3 then clears (step S403) a motion compensation control complete flag.

If the command from the communications microcomputer 24 is not a motion compensation command, the motion compensation microcomputer 3 determines (step S404) whether the motion compensation control complete flag has been set. If the motion compensation control complete flag is not set, the motion compensation microcomputer 3 reads (step S405) a maximum motion compensation time (previously stored in the lens device 1) and stores the maximum motion compensation time value as Tm. However, if the motion compensation control complete flag is set, the operational process returns to the flow chart of FIG. 2. Next, the present time is read (step S406) and stored as Tp. In step S407, the difference between the motion compensation start time Ts and the present time Tp is calculated and subtracted from a predetermined maximum motion compensation time Tm to determine a value Te. More specifically, Te=Tm−(Tp−Ts).

It is then determined (step S408) whether Te is greater than zero. If Te is greater than zero, the operational process proceeds to step S409 and the motion compensation microcomputer 3 calculates a motor drive duty to be transmitted to the X-axis motor driver 8 and to the Y-axis motor driver 12.

If Te is less than or equal to zero, the operational process proceeds to step S410, the motion compensation microcomputer 3 sets zero as the value of the motor drive duty to be transmitted to X-axis motor drive 8 and Y-axis motor drive 12 thereby stopping the motion compensation control operation. The operational process then proceeds to step S411, and the motion compensation control complete flag is set.

In accordance with embodiments of the present invention, the function which stops the motion compensation control operation after the predetermined maximum motion compensation time Tm has passed from the start of motion compensation control is preferably located in the lens device 1. For example, the lens may include a memory which stores parameters related to a predetermined maximum motion compensation time for the particular lens, and a memory which stores a time when the motion compensation control start command is received. When the exposure control time exceeds the predetermined maximum motion compensation time Tm, the error in target driving speed of the motion compensation optical system, calculated by motion compensation calculations, will not cause the amount of image motion during exposure to increase.

Figure 5:
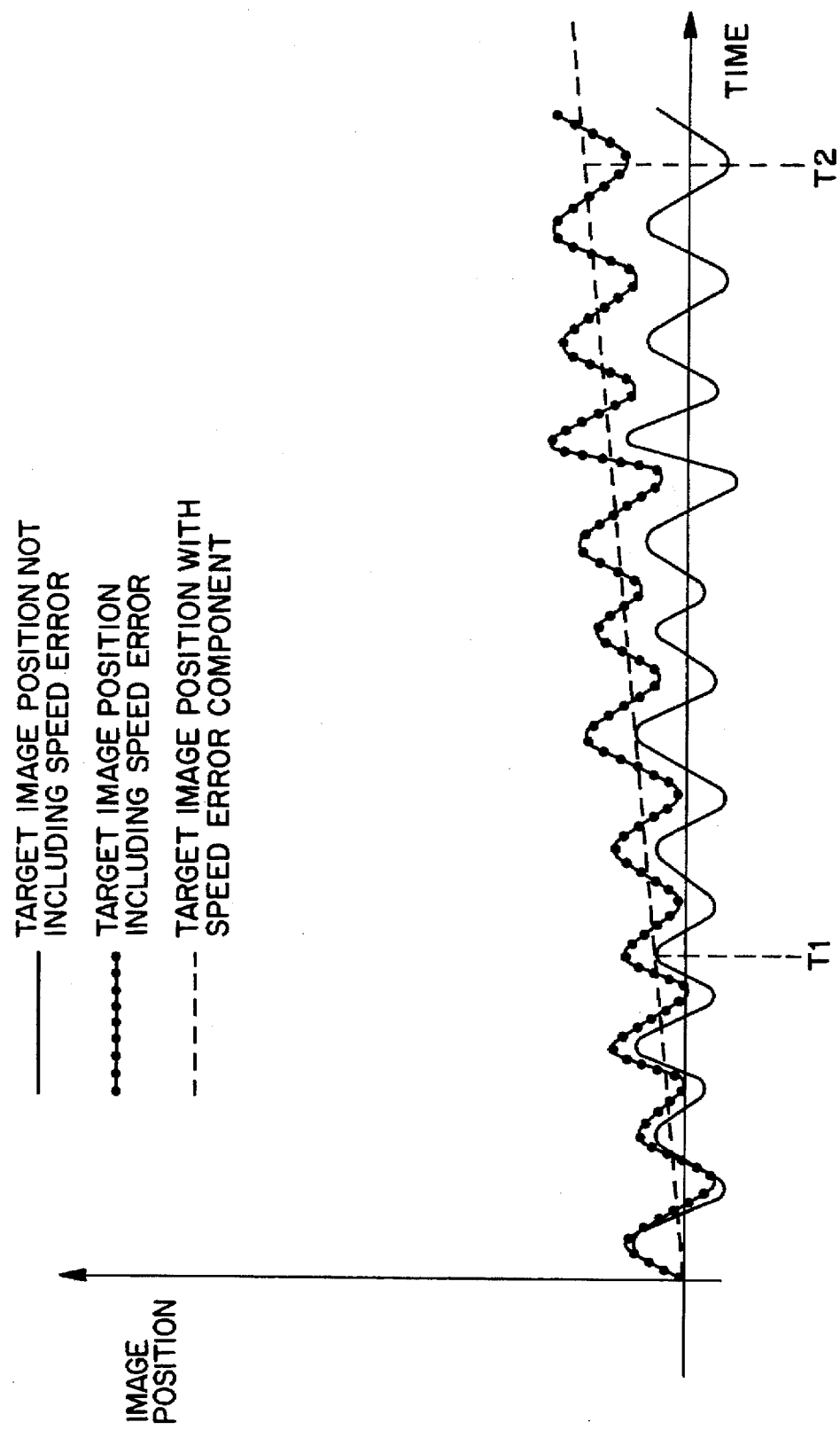
FIG. 5 shows a target driving speed of a motion compensation drive plotted on a graph of time vs. angular velocity, both including and not including speed error.

In FIG. 5, a difference in an image position due to the target speed of the motion compensation drive, with and without including speed error, is plotted in a graph of time vs. image position.

If the target speed of the motion compensation drive, not including speed error, is $V_t=f1(t)$, and the speed error is $V_e=K$, then the target angular velocity including speed error can be represented as $V_{te}=f2(t)=f1(t)+K$.

A quantity representing image motion S1 during exposure, caused by target speed error, from time 0 to time T2 is, $$S1 = \text{integral}[f2(t)-f1(t)]dt = \text{integral}(K)\, dt,$$

where the range of integration is from 0 to T2.

When there is no motion compensation performed, an amount of image motion S2 during exposure, caused by vibration of the camera without motion compensation control, over time 0 to T2 is the following absolute value, $$S2 = \text{integral } |f1(t)|dt,$$

where the range of integration is from 0 to T2.

As shown in FIG. 5, the amount of image motion during exposure due to motion compensation control S1 is large compared to S2, the amount of image motion during exposure when motion compensation is not performed.

The values of S1 and S2 from time 0 to T1 are calculated. Compared to the amount of image motion when there is no motion compensation control S2, the value of S1, the amount of image motion during exposure due to the amount of speed error, is small. The effect of motion compensation control is sufficient.

By stopping the motion compensation control at a fixed time Tm=T1 (where Tm is selected as the value of T1), the error in target driving speed of the motion compensation optical system, calculated by motion compensation calculations, will not cause the amount of image motion during exposure to increase to a level such that the motion compensation control is not effective.

The maximum time Tm should be set to a time where the amount of image motion during exposure caused by error in target driving speed of the motion compensation drive is within the tolerance range of the motion compensation drive.

Speed error is believed to be similar to low frequency motion outside the detection motion frequency range.

The present invention is not limited to the above-described embodiments, and many variations and modifications are possible. For example, embodiments of the present invention were described with respect to a single lens reflex camera having a freely detachable lens device. The present invention can also be applied to a camera in which the lens device cannot be removed (an integrated model).

As explained in detail above, in accordance with embodiments of the present invention, the motion compensation drive device is stopped after a predetermined amount of time has passed since the start of motion compensation control, preventing an increase in the amount of image motion during exposure due to error in target driving speed of the motion compensation driving device. As a result, a good quality picture may be obtained. Further, since the motion compensation drive stop device is included in the lens device, accurate motion compensation and stopping are possible based on the different motion compensation tolerance ranges for each lens device.

Further, in accordance with embodiments of the present invention, since the motion compensation stop device sets a predetermined amount of time during which the target driving speed error of the motion compensation drive is within the tolerance of the motion compensation drive, motion compensation can be performed for the longest time interval in which error does not become large.

The present invention is described as relating to a camera. However, the present invention is not intended to be limited to a camera. For example, the present invention can be used in devices including, but not limited to, camcorders, motion picture cameras, telescopes, binoculars, microscopes, range finding equipment, lasers, fiber optic communication systems, various optical projection systems and CD mastering systems.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A camera having a motion compensation device to compensate for motion of an optical system, comprising:
   a motion compensation device start signal generating device to supply a signal to the motion compensation device to start the motion compensation device;
   a lens device including a memory to store a parameter related to a predetermined time after the start signal is initially supplied to the motion compensation device to stop the motion compensation device; and
   a motion compensation stop signal generating device to generate a signal to stop the motion compensation device in accordance with the parameter related to the predetermined time.

2. A camera as recited in claim 1, wherein the motion compensation stop signal generating device generates a signal to stop the motion compensation device regardless of whether the motion compensation start signal generating device is generating a signal to start motion compensation control.

3. A camera as recited in claim 2, wherein the lens includes a motion compensation completion time computing device to compute a time to generate the signal to stop the motion compensation device based on a time the signal to start the motion compensation device is received by the motion compensation device and the parameter related to predetermined time.

4. A motion compensation device, comprising:
   a photographic optical system;
   a motion detection device to detect motion of the photographic optical system;
   a motion compensation drive to shift at least a portion of the photographic optical system and an imaging plane relative to each other;
   a motion compensation control unit to generate a motion compensation drive control signal to drive the motion compensation drive based on the output of the motion detection device; and
   a motion compensation drive stop device to stop the drive of the motion compensation drive after a predetermined amount of time has passed since the motion compensation drive was started, while the motion compensation control signal generated by the motion compensation control unit generates the drive control signal to drive the motion compensation drive.

5. A motion compensation device as recited in claim 4, wherein the motion compensation drive stop device sets the predetermined amount of time according to a time period during which a target driving speed error of the motion compensation drive is within a tolerance range of the motion compensation drive.

6. A motion compensation device as recited in claim 4, wherein the motion compensation drive stop device includes,
   a memory storing a parameter related to a predetermined time to stop the motion compensation drive and to a time when the motion compensation control start signal was received, and
   a motion compensation completion time computing device to compute a time to stop the motion compensation drive based on the stored signal reception time and the parameter related to a predetermined time.

7. A motion compensation device, comprising:
   a photographic optical system;
   a motion detection device to detect motion of the photographic optical system;
   a motion compensation drive to shift at least a portion of the photographic optical system and an imaging plane relative to each other;
   a motion compensation control unit to generate a motion compensation control start signal to start the motion compensation drive based on the output of the motion detection device; and
   a motion compensation drive stop device to stop the drive of the motion compensation drive after a predetermined amount of time has passed since the motion compensation drive was started, regardless of the motion compensation control signal generated by the motion compensation control unit, wherein the motion compensation drive stop device sets the predetermined amount of time according to a time period during which a target driving speed error of the motion compensation drive is within a tolerance range of the motion compensation drive.

8. A motion compensation device, comprising:
   a photographic optical system;
   a motion detection device to detect motion of the photographic optical system;
   a motion compensation drive to shift at least a portion of the photographic optical system and an imaging surface relative to each other;
   a motion compensation control unit to generate a motion compensation control start signal to start the motion compensation drive based on the output of the motion detection device; and
   a motion compensation drive stop device to stop the drive of the motion compensation drive after a predetermined amount of time has passed since the motion compensation drive was started, regardless of the motion compensation control signal generated by the motion compensation control unit, wherein the motion compensation drive stop device includes,
- a memory storing a parameter related to a predetermined time to stop the motion compensation drive and to a time when the motion compensation control start signal was received, and
- a motion compensation completion time computing device to compute a time to stop the motion compensation drive based on the stored signal reception time and the parameter related to a predetermined time.

9. A method for performing motion compensation control to compensate for motion of an image formed by an optical system, comprising the steps of:

setting a predetermined maximum amount of time for performing a motion compensation operation;

performing a motion compensation operation in response to a motion compensation start command;

determining an amount of time which has elapsed from the start of performing the motion compensation operation;

comparing the maximum amount of time for performing motion compensation with the amount of time which has elapsed from the start of performing the motion compensation operation; and stopping the motion compensation operation in response to the comparison indicating that the elapsed amount of time is greater than or equal to the maximum amount of time for performing the motion compensation operation.

* * * * *